United States Patent
Suzuki et al.

(10) Patent No.: US 11,461,727 B2
(45) Date of Patent: Oct. 4, 2022

(54) PLANT EVALUATION SYSTEM, PLANT EVALUATION METHOD, AND PROGRAM

(71) Applicants: MITSUBISHI HEAVY INDUSTRIES, LTD., Tokyo (JP); Mitsubishi Hitachi Power Systems, Ltd., Yokohama (JP)

(72) Inventors: Naoki Suzuki, Tokyo (JP); Shintaro Kumano, Tokyo (JP); Katsuhiko Abe, Yokohama (JP); Keisuke Yamamoto, Tokyo (JP); Makoto Kishi, Tokyo (JP); Yukihiko Inoue, Tokyo (JP); Shun Niizuma, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 127 days.

(21) Appl. No.: 16/496,665

(22) PCT Filed: Mar. 23, 2018

(86) PCT No.: PCT/JP2018/011744
§ 371 (c)(1),
(2) Date: Sep. 23, 2019

(87) PCT Pub. No.: WO2018/181009
PCT Pub. Date: Oct. 4, 2018

(65) Prior Publication Data
US 2020/0265361 A1    Aug. 20, 2020

(30) Foreign Application Priority Data
Mar. 29, 2017    (JP) .............................. JP2017-065957

(51) Int. Cl.
*G06Q 10/06*    (2012.01)
*G06N 20/00*    (2019.01)
(Continued)

(52) U.S. Cl.
CPC ......... *G06Q 10/06393* (2013.01); *F02C 9/00* (2013.01); *G06N 5/04* (2013.01);
(Continued)

(58) Field of Classification Search
CPC .. G06Q 10/06393; G06Q 50/06; G06Q 10/06; G05B 23/02; G05B 17/02; G05B 13/048; Y04S 10/50; Y02P 90/30
See application file for complete search history.

(56) References Cited

U.S. PATENT DOCUMENTS 5,455,777 A    10/1995  Fujiyama et al.
8,214,692 B1    7/2012  Spalink et al.
(Continued)

FOREIGN PATENT DOCUMENTS

CN    106289836 A  *  1/2017  ............ G01M 99/00
JP    H06-180281 A    6/1994
(Continued)

OTHER PUBLICATIONS

E. Gallestey, et al. "Model predictive control and the optimization of power plant load while considering lifetime consumption," in IEEE Transactions on Power Systems, vol. 17, No. 1, pp. 186-191, Feb. 2002, doi: 10.1109/59.982212. <https://ieeexplore.ieee.org/document/982212?source=IQplus> (Year: 2002).*
(Continued)

*Primary Examiner* — Jerry O'Connor
*Assistant Examiner* — Michael R Koester
(74) *Attorney, Agent, or Firm* — WHDA, LLP

(57) ABSTRACT

A plant evaluation system is configured to calculate performance of a plant while receiving setting of operating conditions of the plant and devices installed in the plant and simulating a secular change occurring in the plant during an evaluation target period included in the operating conditions. At least one of the devices is added, a selection of a
(Continued)

component improving performance of a certain device is received, and an improvement of the performance of the device by the component is expected and the performance of the plant is calculated.

11 Claims, 8 Drawing Sheets

(51) Int. Cl.
  *F02C 9/00* (2006.01)
  *G06N 5/04* (2006.01)
  *G06Q 50/06* (2012.01)

(52) U.S. Cl.
  CPC ....... *G06N 20/00* (2019.01); *G06Q 10/06315* (2013.01); *G06Q 50/06* (2013.01)

(56) References Cited

U.S. PATENT DOCUMENTS

| | | | |
|---|---|---|---|
| 2004/0125355 A1 | 7/2004 | Naya et al. | |
| 2004/0204908 A1 | 10/2004 | Hosaka et al. | |
| 2008/0234869 A1 | 9/2008 | Yonezawa et al. | |
| 2009/0093997 A1* | 4/2009 | Fluegge | G06Q 10/0639 702/182 |
| 2013/0046519 A1 | 2/2013 | Esakki et al. | |
| 2016/0097324 A1* | 4/2016 | Taylor | B01D 53/0454 29/889.22 |
| 2016/0258363 A1 | 9/2016 | Tiwari et al. | |
| 2017/0356346 A1* | 12/2017 | Jiang | F04D 27/0292 |
| 2018/0230907 A1* | 8/2018 | Ewens | G01M 15/14 |
| 2019/0041079 A1* | 2/2019 | Kohn | F24F 11/30 |

FOREIGN PATENT DOCUMENTS

| | | | | |
|---|---|---|---|---|
| JP | 2001-273006 A | | 10/2001 | |
| JP | 2004-170225 A | | 6/2004 | |
| JP | 2004-211587 A | | 7/2004 | |
| JP | 2006-011769 A | | 1/2006 | |
| JP | 2006-300712 A | | 11/2006 | |
| JP | 2007002673 A | * | 1/2007 | |
| JP | 2008-047075 A | | 2/2008 | |
| JP | 2016-173103 A | | 9/2016 | |
| TW | 200424901 A | | 11/2004 | |
| TW | I230400 B | | 4/2005 | |
| TW | I341377 B | | 5/2011 | |
| TW | I543100 B | | 7/2016 | |
| WO | WO-2017146637 A1 | * | 8/2017 | ........... B01D 35/143 |

OTHER PUBLICATIONS

Shingu, N. et al., "Development of Technology to Prevent Performance Degradation by Improving Intake Air Filtration Systems for Large Gas Turbines", The Thermal and Nuclear Power, Feb. 15, 2003, vol. 54, No. 2, pp. 42-48; Cited in the ISR dated Jun. 12, 2018. (9 pages).
International Search Report dated Jun. 12, 2018, issued in counterpart Application No. PCT/JP2018/011744, with English translation. (4 pages).
Written Opinion dated Jun. 12, 2018, issued in counterpart Application No. PCT/JP2018/011744, with English translation. (13 pages).

* cited by examiner

PLANT EVALUATION SYSTEM, PLANT EVALUATION METHOD, AND PROGRAM

TECHNICAL FIELD

The present invention relates to a plant evaluation system, a plant evaluation method, and a program. Priority is claimed on Japanese Patent Application No. 2017-65957, filed Mar. 29, 2017, the content of which is incorporated herein by reference.

BACKGROUND ART

Design of plants such as power stations and evaluation of performance of the designed plants have been widely performed using plant design simulators.

For example, Patent Document 1 discloses a computer that operates a plant design simulator. When selection of devices of a gas turbine, a steam turbine, and a condenser included in a power plant is accepted, the computer calculates not only a model of each of the selected devices but also thermal balance features between the devices by thermal efficiency calculation module, and performs evaluation of the performance of a plant and calculation of cost using the results. The computer optimizes configurations of the devices installed in the plant in accordance with the calculation results.

CITATION LIST

Patent Literature

[Patent Document 1]
United States Patent Application Publication No. 2013/0046519

SUMMARY OF INVENTION

Technical Problem

However, Patent Document 1 or the like discloses optimization of a plant performed using a module of each device or thermal balance features between the devices at the time of design, but does not describe a plant evaluation method in consideration of a secular change in performance of the plant, selection of various optional components compensating for deterioration in the performance due to the secular change, or the like. Therefore, there is concern of performance evaluated at the time of design being not exerted during an actual operation of the plant.

The prevent invention provides a plant evaluation system, a plant evaluation method, and a program capable of solving the above-described problems.

Solution to Problem

According to a first aspect of the present invention, there is provided a plant evaluation system including: a plant form information acquisition unit configured to receive an input of plant form information in which a combination of configurations of devices installed in a plant is decided; a condition acquisition unit configured to receive an input of a condition related to evaluation of the plant indicated by the plant form information; a performance information calculation unit configured to calculate performance of the plant in which a secular change occurring in the plant dining an evaluation target period included in the condition is reflected; and an optional component selection unit configured to select a component which is used for at least one of the devices included in the plant and improving performance of the device. The performance information calculation unit is configured to calculate the performance of the plant in which an improvement of the performance of the device by the component selected by the optional component selection unit is reflected.

According to a second aspect of the present invention, in the plant evaluation system, the component may improve the performance of the device and improve the performance of the plant including the device. The performance information calculation unit may calculate the performance of the plant in which the improvement of the performance of the plant by the component selected by the optional component selection unit is reflected.

According to a third aspect of the present invention, in the plant evaluation system, the performance information calculation unit may calculate an influence of the component on the plant in accordance with a configuration of the selected device.

According to a fourth aspect of the present invention, the plant evaluation system may further include a cost calculation unit configured to calculate initial cost of the selected device, cost necessary to add the component, and running cost according to performance improved by adding the component.

According to a fifth aspect of the present invention, in the plant evaluation system, the plant may be a power plant. The cost calculation unit may calculate cost regarding fuel cost able to be reduced due to the improvement in the performance of the plant by adding the component and a profit obtained by increasing power selling.

According to a sixth aspect of the present invention, in the plant evaluation system, the cost calculation unit may calculate a power selling profit in accordance with an amount of power according to the amount of power of the power plant and a prediction model of a power selling price.

According to a seventh aspect of the present invention, in the plant evaluation system, the cost calculation unit may calculate a fuel price necessary for power generation according to an amount of fuel necessary for the power plant to generate power and a prediction model of the fuel price.

According to an eighth aspect of the present invention, in the plant evaluation system, the device may be a gas turbine. The component may be a high efficiency particulate air filter (HEPA).

According to a ninth aspect of the present invention, there is provided a plant evaluation method in a plant evaluation system. The method includes: a step of receiving an input of plant form information in which a combination of configurations of devices installed in a plant is decided a step of receiving an input of a condition related to evaluation of the plant indicated by the plant form information; a step of calculating performance of the plant in which a secular change occurring in the plant during an evaluation target period included in the condition is reflected; and a step of selecting a component which is used for at least one of the devices included in the plant to improve performance of the device. In the step of calculating of the performance of the plant, the performance of the plant in which an improvement of the performance of the device by the selected component is reflected is calculated.

According to a tenth aspect of the present invention, there is provided a program causing a computer included in a plant evaluation system to function as: a means for receiving an input of plant form information in which a combination of configurations of devices installed in a plant is decided; a means for receiving an input of a condition related to evaluation of the plant indicated by the plant form information; a means for calculating performance of the plant in which a secular change occurring in the plant during an evaluation target period included in the condition is reflected; and a means for selecting a component which is used for at least one of the devices included in the plant and improving performance of the device. The means for calculating the performance of the plant is configured to calculate the performance of the plant in which an improvement of the performance of the device by the selected component is reflected.

Advantageous Effects of Invention

In the plant evaluation system, the plant evaluation method, and the program described above, it is possible to evaluate a plant appropriately in consideration of a secular change in the plant and measures for remedying the secular change.

DESCRIPTION OF EMBODIMENTS

First Embodiment

Hereinafter, a plant evaluation device according to a first embodiment of the present invention will be described with reference to FIGS. 1 to 5.

Figure 1:
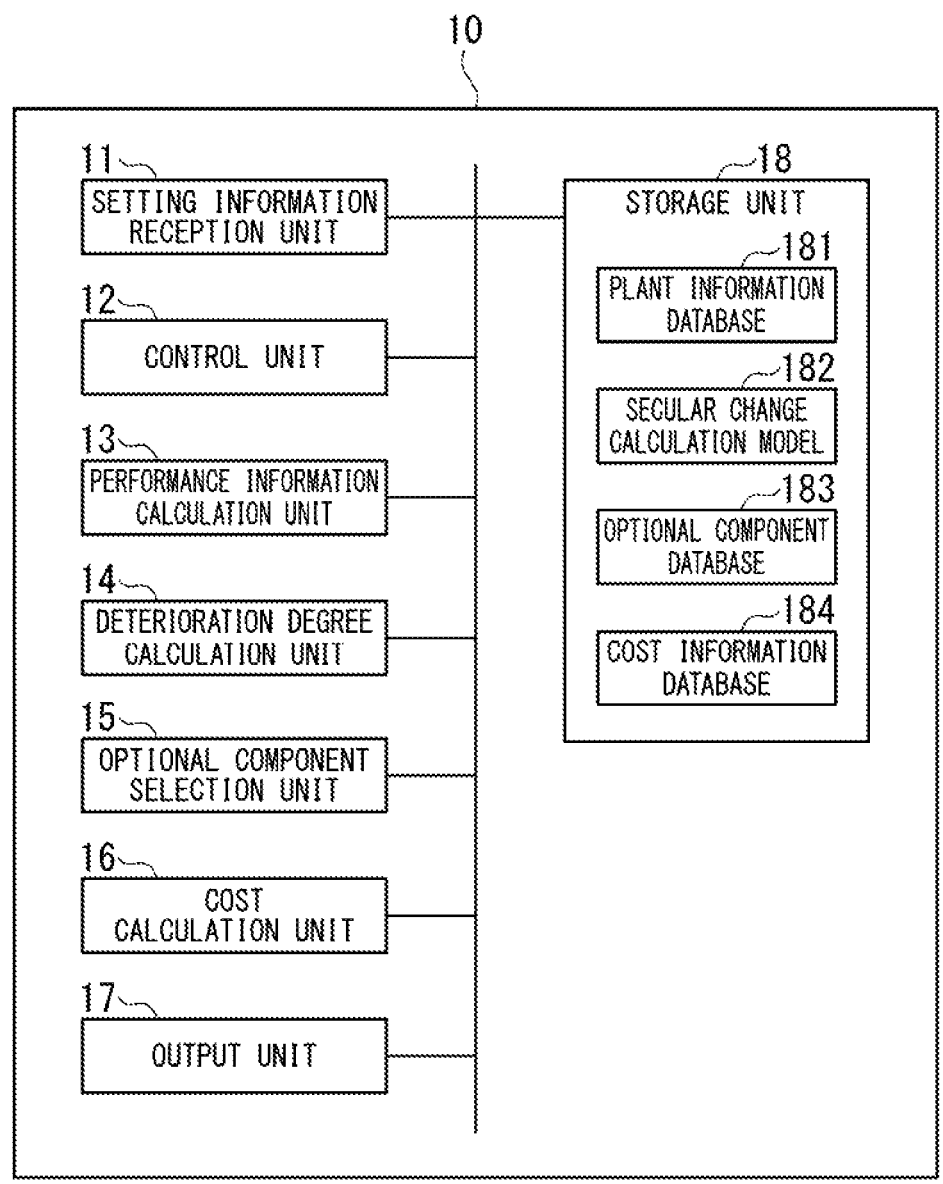
FIG. 1 is a functional block diagram showing a plant evaluation device according to a first embodiment of the present invention.

FIG. 1 is a functional block diagram showing the plant evaluation device according to the first embodiment of the present invention.

A plant evaluation system according to the embodiment calculates an economic evaluation value of a plant in consideration of deterioration in performance due to a secular change or an improvement of the performance made by applying an optional component. The plant evaluation system is configured by, for example, a computer such as a one server terminal device or a plurality of server terminal devices. A plant evaluation device 10 in FIG. 1 is an example of a plant evaluation system when the plant evaluation system is configured by one computer.

Hereinafter, a case in which the evaluation target plant is a power plant (gas turbine combined cycle (GTCC)) will be described as an example. As shown in FIG. 1, the plant evaluation device 10 includes a setting information reception unit 11, a control unit 12, a performance information calculation unit 13, a deterioration degree calculation unit 14, an optional component selection unit 15, a cost calculation unit 16, an output unit 17, and a storage unit 18.

The setting information reception unit 11 receives an input of form information regarding an evaluation target plant and information indicating various conditions related to evaluation of the plant. The form information regarding the plant is information for deciding a combination of configurations of devices installed in the plant. For example, there are plant forms such as (Form 1) one gas turbine and one steam turbine, (Form 2) two gas turbines and one steam turbine, and (Form 3) three gas turbines and two steam turbines. The various conditions related to evaluation of the plant (simulation setting information) are operating environment information, operating pattern information, economic index values of the plant, and the like. The operating environment information of the plant is, for example, a place in which the plant is built (a coast area, an inland area, or the like), the temperature, humidity, $SO_2$ concentration, $NO_X$, the amount of dust in the atmosphere, and the like. The operating environment information includes deterioration factor information indicating that deterioration of the plant has progressed. The operating pattern information of the plant includes a target output, a target fuel reduction amount (target fuel consumption amount), an evaluation period of the plant, an evaluation unit time, and an application start time of an optional component to be described below. The economic index values are a fuel unit price, a power selling unit price, and the like. When an input of the information is received, the setting information reception unit 11 records the information in the storage unit 18.

The control unit 12 performs various kinds of control such as activation and stopping of the plant evaluation device 10 and starting and ending of a plant evaluation process.

The performance information calculation unit 13 calculates performance information regarding the whole plant or devices included in the plant. In particular, in the embodiment, the performance information calculation unit 13 calculates performance of a single device or the whole plant in which an influence of a secular change occurring in the plant or an improvement of performance by an optional component is reflected. Here, the performance is the magnitude of an output of generated power, power generation efficiency, a fuel consumption amount, or the like.

The deterioration degree calculation unit 14 calculates deterioration of each device and the deterioration degree of the performance of the device due to the influence according to a secular change model stored in the storage unit 18. Here, the deterioration of the device is corrosion, abrasion, crack, or the like. The deterioration degree of performance is a change in thermal efficiency or a material balance.

The optional component selection unit 15 specifies a component that is used for at least one of the devices included in the plant and improves the performance of the device. For example, the optional component selection unit 15 specifies a component that compensates for the deterioration in the performance of the device caused due to a deterioration factor for which priority of a countermeasures is high in accordance with the deterioration in the device calculated by the deterioration degree calculation unit 14.

The cost calculation unit 16 calculates cost necessary to operate the plant during an evaluation period and an obtainable profit by applying a fuel unit price and a power selling unit price to performance information (an output or a fuel consumption amount) calculated by the performance information calculation unit 13. The cost or the profit calculated by the cost calculation unit 16 is a value in which an influence of a secular change occurring in the plant or an improvement in the performance by an optional component is reflected.

The output unit 17 displays the performance information calculated by the performance information calculation unit 13 or cost information calculated by the cost calculation unit 16 on a display connected to the plant evaluation device 10.

The storage unit 18 stores various pieces of information necessary for a plant evaluation process. For example, the storage unit 18 stores a plant information database 181, a secular change calculation model 182, an optional component database 183, and a cost information database 184.

The plant information database 181 stores plant form information. As described above, the plant form information includes device configuration information indicating which devices are installed in the plant and how many devices are installed. For example, the plant information database 181 may store plant form information regarding a known (operating) plant. In this case, conditions related to plant evaluation such as operating environment information and operating pattern information of the known plant may be recorded together. In the plant information database 181, a performance model of one device or a plurality of all devices is recorded. The performance model is performance information such as a mass balance, a heat balance, thermal efficiency, and a design value of an output of each device or a heat balance of the plurality of all devices, thermal efficiency according to the heat balance, an output, and the like. In calculation of the heat balance in the plurality of all devices, output values of devices at the front stage may be standardized in accordance with standard states pre-decided for each device and may be set as input values of subsequent devices when energy between the devices is delivered. The performance model stored in the plant information database 181 is an ideal model at the time of design and a secular change or the like is not considered. In the plant information database 181, a performance model in the device configuration is recorded for each plant form. For example, in the performance model, how the performance of the entire plant is calculated is determined according to an output of each device in a configuration of 2 on 1 (two gas turbines and one steam turbine) provided as an exemplary example in FIG. 4(*a*) and a configuration of 3 on 2. (three gas turbines and two steam turbines) provided as an exemplary example in FIG. 4(*b*).

The secular change calculation model 182 is a model that simulates a deterioration degree of a device due to a secular change. The secular change calculation model 182 is, for example, a model constructed according to achievement data such as a secular change, deterioration, breakdown, and the like of each device included in past operating data of the same kind of plant. For example, when the deterioration degree calculation unit 14 inputs an elapsed time t1 from a plant operation start or an operating pattern (for example, continuous operating at a rated load) during that time to the secular change calculation model 182, the secular change calculation model 182 outputs deterioration information such as crack or corrosion occurring in a device at the elapsed time t1. The secular change calculation model 182 calculates and outputs information such as (1) a deterioration degree (for example, 90% of an output) of performance of a device due to deterioration, (2) deterioration in performance of downstream devices operating by receiving an output of the device occurring due to the deterioration in the performance of the device, and (3) deterioration in the performance of the whole plant. The secular change calculation model 182 may output a mass balance or a heat balance in which a secular change in each device is reflected. The performance information calculation unit 13 calculates performance of one device or the whole plant in rich an influence of the secular change occurring in the plant is reflected using a calculation result of the secular change calculation model 182. For example, when deterioration in the performance of one device in which deterioration occurs is 90% and deterioration in the performance of the whole plant is 80%, the performance information calculation unit 13 sets 80% of a plant output calculation value in a designated operating pattern, a designated operating environment, and a designated plant form as an output of the plant at elapsed time t1.

The optional component database 183 stores information regarding a component which can be mounted on the device for each device. For example, for a standard component A used for a gas turbine, a component A1 used to improve output performance of the gas turbine more than the component A, a component B which deteriorates less than the component A and is durable although output performance is not improved, and the like, information such as initial cost of the component, performance information (how much the performance is improved), and an influence on another device or the whole plant (how much the performance of another device or the plant is improved) is recorded in the optional component database 183. In the optional component database 183, a mass balance or a heat balance at the time of application of the component may be recorded. Either the performance information or influence information on another device or the like is information according to achievement data measured when the component is applied to an actual machine and is preferably a realistic numerical value indicating an actual effect of an optional component. The optional component selection unit 15 selects an effective component from the optional component database 183 to take measures against deterioration in a device for which priority of countermeasures is high. For example, when the optional component selection unit 15 selects the component A1 with respect to the component A, the performance information calculation unit 13 calculates how much an output is improved in one gas turbine, how much the performance of the device (for example, a steam turbine) located downstream is improved, and how much the performance of the whole plant is improved according to information recorded in the optional component database 183. Components registered in the optional component database 183 are not limited to the standard components and substitute components for the standard components, but may be additionally added components. When a component is exchanged, a positive influence may not necessarily be imparted to other devices. For example, when a component which is added to a gas turbine is added, only the performance of the gas turbine may be improved and there may be no influence on the performance of the whole plant or other devices in some cases. Alternatively, a component that deteriorates a fuel expense despite an improvement in an output for one gas turbine may be used.

Information regarding an influence on other devices or the whole plant may be registered for each plant form, as will be described below with reference to FIG. 4.

The cost information database 184 stores a fuel unit price and a power selling unit price. The cost calculation unit 16 calculates a power selling profit, for example, by multiplying an integrated value of a power plant output calculated by the performance information calculation unit 13 by the power selling unit price. The cost calculation unit 16 calculates a cost reduction due to an improvement in the fuel expense, for example, by multiplying a fuel expense integration value calculated by the performance information calculation unit 13 by the fuel unit price.

(Hardware Configuration)

Figure 2:
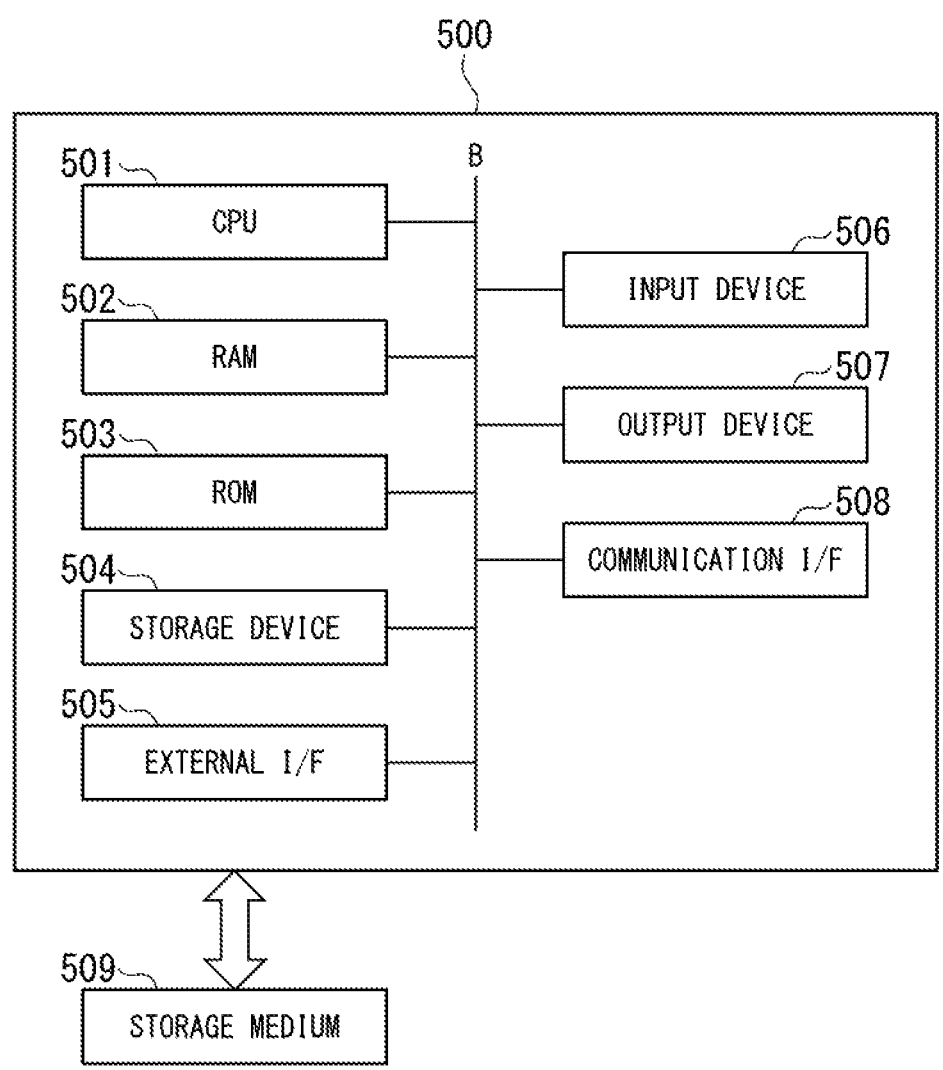
FIG. 2 is a diagram showing an example of a hardware configuration of the plant evaluation device according to the first embodiment of the present invention.

The plant evaluation device 10 according to an embodiment can be realized using, for example, a general computer 500. FIG. 2 shows an example of a configuration of the computer 500.

FIG. 2 is a diagram showing an example of a hardware configuration of the plant evaluation device according to the first embodiment of the present invention.

The computer 500 includes a central processing unit (CPU) 501, a random access memory (RAM) 502, a read-only memory (ROM) 503, a storage device 504, an external interface (I/F) 505, an input device 506, an output device 507, and a communication I/F 508. These devices mutually transmit and receive signals via a bus B.

The CPU 501 is an arithmetic device that realizes each function of the computer 500 by reading a program or data stored in the ROM 503, the storage device 504, or the like on the RAM 502 and performing a process. For example, the setting information reception unit 11, the control unit 12, the performance information calculation unit 13, the deterioration degree calculation unit 14, the optional component selection unit 15, the cost calculation unit 16, and the output unit 17 described above are functions of the computer 500 when the CPU 501 reads and executes programs stored in the ROM 503 or the like. The RAM 502 is a volatile memory used as a work area of the CPU 501. The ROM 503 is a nonvolatile memory that retains programs or data even when power is off. The storage device 504 is realized by, for example, a hard disk drive (HDD), a solid state drive (SSD), or the like and stores an operating system (OS), an application program various kinds of data, and the like. The external I/F 505 is an interface with an external device. As the external device, for example, there is a recording medium 509 or the like. The computer 500 can perform reading and writing on the recording medium 509 via the external I.T. 505. The recording medium 509 includes, for example, an optical disc, a magnetic disk, a memory card, a universal serial bus (USB) memory.

The input device 506 includes, for example, a mouse and a keyboard, receives an instruction from an operator, and inputs various operations or the like to the computer 500. The output device 507 is realized by, for example, a liquid crystal display and displays a process result by the CPU 501. The communication I/F 508 is an interface that connects the computer 500 to a network such as the Internet through wired communication or wireless communication. The bus B is connected to each of the constituent devices to transmit and receive various control signals to and from a control device.

Figure 3:
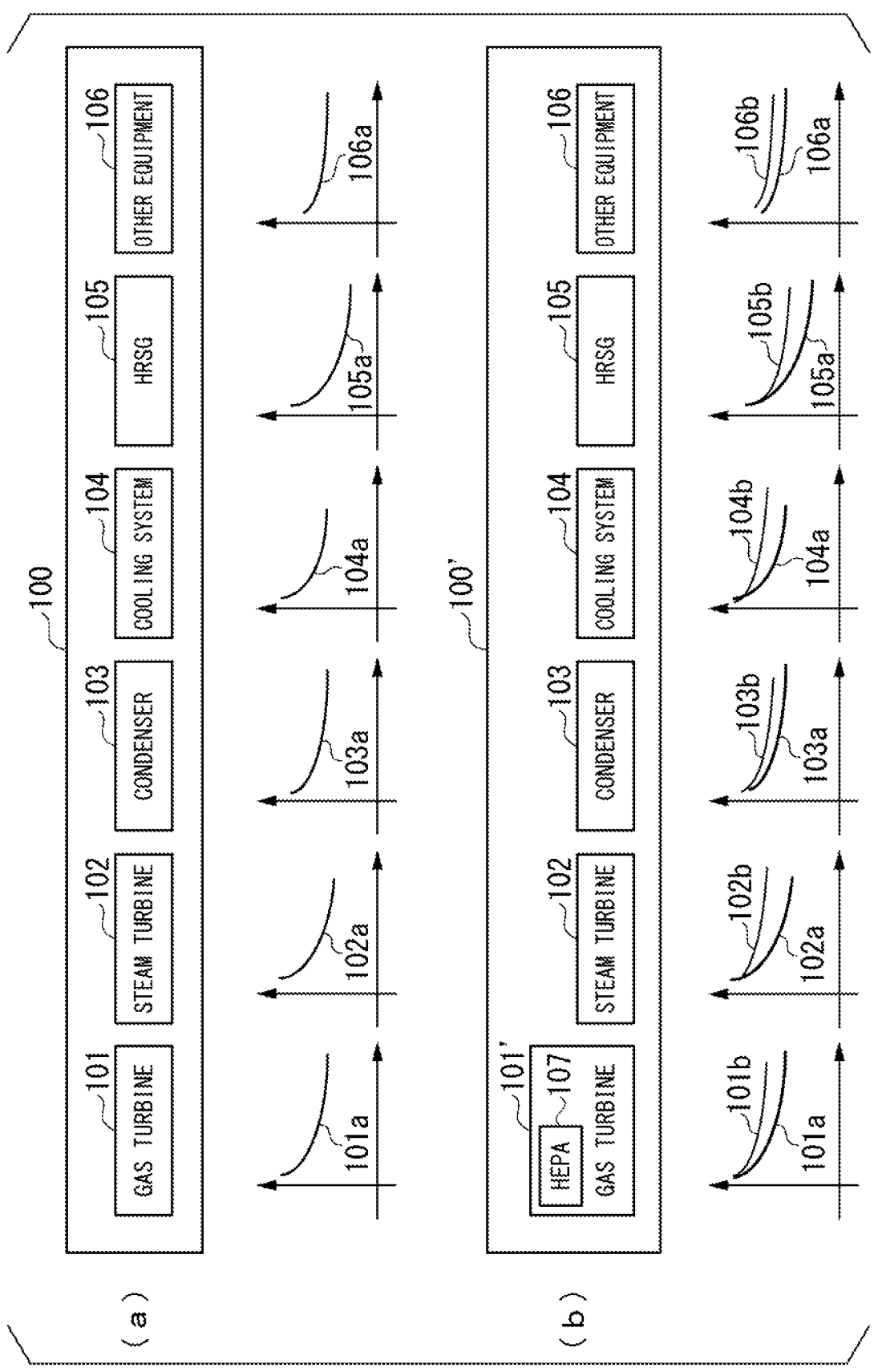
FIG. 3 is a first diagram for describing effects of optional components according to the first embodiment of the present invention.

FIG. 3 is a first diagram for describing effects of optional components according to the first embodiment of the present invention.

FIG. 3(*a*) shows a configuration of the plant 100 and devices included in the plant 100 when no optional component is added, and graphs indicating secular transition of performance of the devices. As shown, the plant 100 includes one gas turbine 101, a steam turbine 102, a condenser 103, a cooling system 104, a heat recovery steam generator (HRSG) 105, and another equipment 106 (pipes or the like). The devices shown on the left side, of the drawing are upstream devices and the devices shown on the right side are downstream devices. A graph 101*a* indicates a secular change in an output of the gas turbine 101. In the graph 101*a*, the horizontal axis represents a time and the vertical axis represents an output of the gas turbine 101. Similarly, a mph 102*a* indicates an output of the steam turbine 102, a graph 103*a* indicates an output of the condenser 103, a graph 104*a* indicates efficiency of the cooling system 104, a graph 105*a* indicates efficiency of the HRSG 105, and a graph 106*a* indicates a secular change in efficiency of the other equipment 106.

The graphs 101*a* to 106*a* are graphs indicating the secular changes, for example, when a rated operation of an output of 100% is set to 70% of the whole and a partial load operation of an output of 20% is set to 30% of the whole, as operating patterns in a year. As indicated in the graphs 101*a* to 106*a*, performance such as an output or efficiency of each device included in the plant 100 degrades over time. The graphs 101*a* to 106*a* are information calculated by the secular change calculation model 182 (the storage unit 18).

FIG. 3(*b*) shows a configuration of a plant 100' and devices included in the plant 100' when a high efficiency particulate air filter (HEPA) 107 which is an optional component is added, and graphs indicating secular transition of performance of the devices.

As shown, the plant 100' includes a gas turbine 101' instead of the gas turbine 101. Other downstream devices from the steam turbine 102 are the same as those of FIG. 3(*a*). The HEPA 107 is mounted on gas turbine 101'. The HEPA 107 is mounted on an inlet side of a compressor included in the gas turbine 101' and serves a function of causing harmful substances causing deterioration of the gas turbine 101' and the plant 100' not to be input. Performance curves of the devices when the HEPA 107 is mounted are shown on the lower parts of FIG. 3(*h*). Specifically, a graph 101*b* indicates a secular change in an output of the gas turbine 101' after the HEPA 107 is applied. A graph 102*a* indicates a secular change in an output of the steam turbine 102 when the HEPA 107 is applied to the gas turbine 101'. Similarly, graphs 103*b*, 104*b*, 105*b*, and 106*b* indicate secular changes in outputs or efficiency of the condenser 103, the cooling system 104, the HRSG 105, and the other equipment 106, respectively, when the HEPA 107 is applied to the gas turbine 101'.

The HEPA 107 has an effect of recovering efficiency of the compressor. As indicated in the graph 101*b*, an output of the gas turbine 101' is improved. As shown, under the improvement in the output of the gas turbine 101', the outputs or performance of the steam turbine 102 (the graph 102*b*), the condenser 103 (the graph 103*b*), the cooling system 104 (the graph 104*b*), the HRSG (the graph 105*b*), and the other equipment 106 (the graph 106*b*) are also improved.

In general, for the gas turbine 101, harmful substances in the atmosphere are device corrosion causes. When the HEPA 107 is introduced, the harmful substances can be removed to suppress an adverse influence of the device corrosion. Thus, the performance of the HRSG 105 is improved. When a new component is applied to the device in this way, there is a component used to improve the performance (for example, a generated power output) of the entire plant or the performance of another device in addition to the device. On the other hand, there is also a component used to improve only performance of the device in which a new component is introduced.

When the component is introduced, initial cost is required. On the other hand, although an improvement in performance can be expected by introducing a component, it is unknown in many cases how much the performance is actually improved in which range and further how the performance is evaluated from the viewpoint of economy.

As will be described below, in the embodiment, data related to effects at the time of application of components on the basis of actual data of an actually operating plant is recorded in the optional component database 183. Based on the information, expectation of the degree of effects can be calculated from both performance (an output improvement or a fuel cost reduction amount) and economy (a power selling profit or a cost reduction amount). Accordingly, for example, even when makers manufacturing devices of a plant take burdensome initial investment cost of optional components and it is difficult to propose the optional components to customers with confidence in the related art, a plant evaluation method according to the embodiment enables the makers to propose an instruction of optional components to the customers with confidence while presenting long-term cost advantages of the optional components which have not been proposed to the customers.

Figure 4:
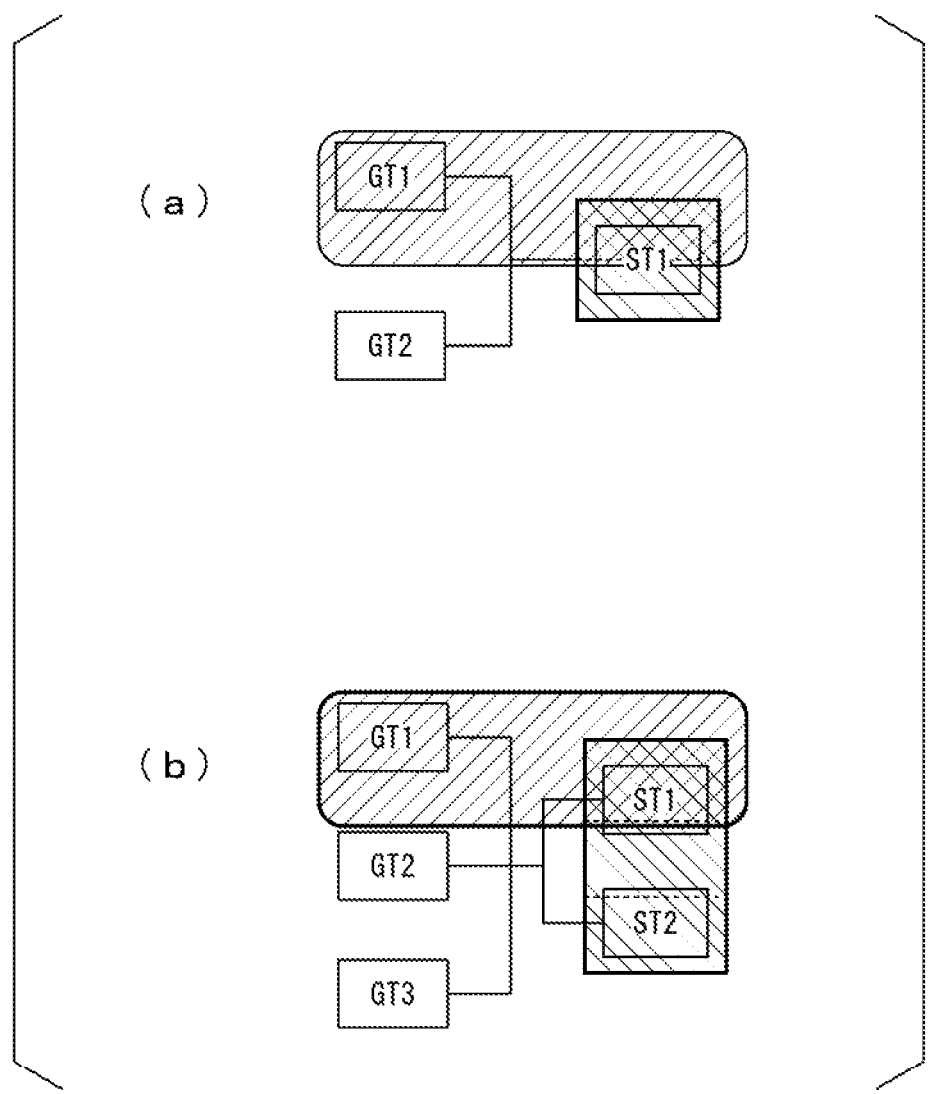
FIG. 4 is a second diagram for describing effects of optional components according to the first embodiment of the present invention.

FIG. 4 is a second diagram for describing effects of optional components according to the first embodiment of the present invention.

As described above, there are various kinds of plant forms. For example, FIG. 4(*a*) shows an exemplary example of a configuration in which one steam turbine (ST1) is provided for two gas turbines (GT1 and GT2). It is assumed that an HEPA is added to only GT1 in this case. In this case, for example, it is considered that ½ of an effect of an improvement in performance by the HEPA is exhibited in one steam turbine. For example, FIG. 4(*b*) shows an exemplary example of a configuration in which two steam turbines (ST1 and ST2) are provided for three gas turbines (GT1, GT2, and GT3). It is assumed that an HEPA is added to only GT1 in this case. In this case, for example, it is considered that ⅓ of an effect of an improvement in performance by the HEPA is exhibited in one steam turbine. In the optional component database 183, performance information is registered for each plant form, as provided as an exemplary example in FIG. 4, in association with information regarding an influence on other devices. The performance information calculation unit 13 calculates an improvement in the performance by the HEPA in accordance with the plant form. For example, when the performance of GT1, GT2, and ST1 before application of the HEPA is assumed to be 1 in the configuration of FIG. 4(*a*) and the HEPA is added to GT1, the performance of GT1 is calculated to 1+α, the performance of GT2 is calculated to 1, and the performance of ST1 is calculated to 1+α/2.

The performance information calculation unit 13 combines the outputs of the devices in which the improvements in the performance by the HEPA are reflected using a performance calculation model of each plant form stored in the plant information database 181 and calculates an output of the entire plant.

Next, a flow of a plant evaluation process according to the embodiment will be described.

Figure 5:
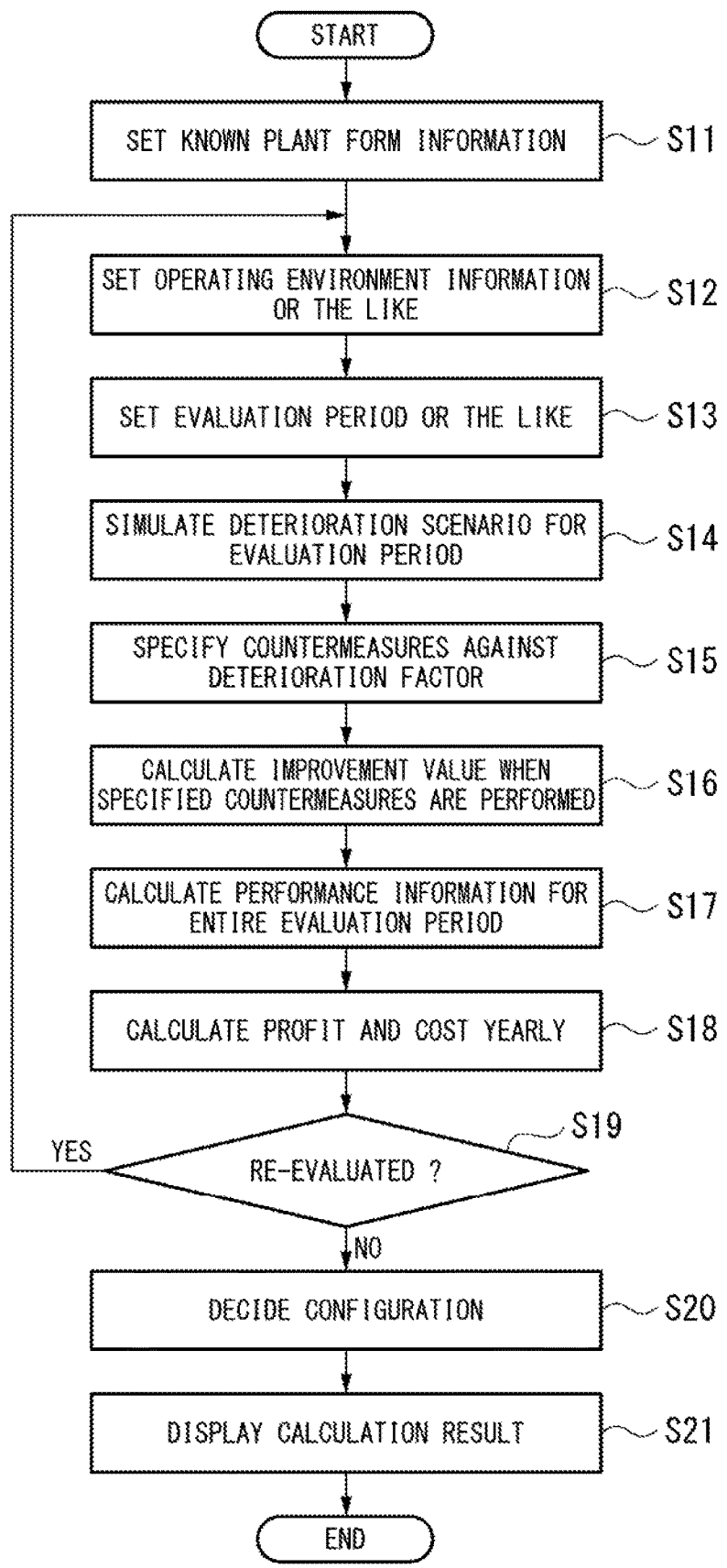
FIG. 5 is a flowchart showing an example of a plant evaluation process according to the first embodiment of the present invention.

FIG. 5 is a flowchart showing an example of the plant evaluation process according to the first embodiment of the present invention.

First, a person in charge of evaluation inputs information regarding a known plant form to the plant evaluation device 10. The known plant form may be configuration information of a plant introduced from now or may be configuration information of a previously operating plant. The setting information reception unit 11 acquires the plant form information and the control unit 12 sets the plant form information as simulation setting information of the plant evaluation process (step S11). Subsequently, the person in charge of evaluation inputs various conditions related to plant evaluation, such as a location (a coast area or an inland area) of an evaluation target plant, operating environment information such as an air temperature, a target output, a target fuel expense reduction amount, an evaluation period, and an application start tune of an optional component. The setting information reception unit 11 acquires the information and the control unit 12 sets the operating environment information or the like as simulation setting information of the plant evaluation process (step S12). Subsequently, the person in charge of evaluation inputs information such as a plant evaluation period, an evaluation unit time (a time unit in which simulation is performed), an application start time of an optional component. When the previously operating plant is evaluated, an operating time or the like up to the present is input. The person in charge of evaluation may input an amount of money of a fuel cost or a power selling profit which is a target of the plant evaluation process. The setting information reception unit 11 acquires the information and the control unit 12 sets the operating environment information or the like as simulation setting information of the plant evaluation process (step S13). When the input of the various conditions ends, the person in charge of evaluation performs an operation of instructing the plant evaluation device 10 to start the plant valuation process. Then, the control unit 12 instructs each functional unit to start the plant evaluation process.

First, the deterioration degree calculation unit 14 simulates a deterioration scenario for the evaluation period (step S14). Specifically, the deterioration degree calculation unit 14 simulates deterioration such as crack, spoilage, or the like occurring in each device per evaluation unit time over an evaluation target period according to the deterioration degree of each device recorded in the secular change calculation model 182. The performance information calculation unit 13 simulates the deterioration degree of performance of each device per evaluation unit time over the evaluation target period according to a performance model of each device or all the devices recorded in the plant information database 181 and the deterioration degree of each device by the secular change calculation model 182. In this way, for example, the graphs 101*a* to 106*a* provided as exemplary examples in the lower part of FIG. 3(*a*) are generated. The performance information calculation unit 13 calculates performance information of the entire plant per evaluation unit time according to the performance model of all the devices and the performance information of each device in which a secular change (deterioration degree) calculated by the deterioration degree calculation unit 14 is reflected. The performance information of the entire plant includes transition of a generated power output and transition of a fuel consumption amount necessary for power generation. In simulation of the deterioration scenario by the secular change calculation model 182, a deterioration scenario occurring in a plurality of devices, such as corrosion occurring in the plurality of devices when harmful substances circulate in each device along with the deterioration in one device (mechanical deterioration such as crack or abrasion), can be simulated.

Subsequently, the optional component selection unit 15 specifies countermeasures (optional component) against the deterioration factor (step S15). For example, the optional component selection unit 15 selects an optional component effective as countermeasures against deterioration (for example, corrosion) with high priority in the deterioration scenario simulated in step S14 from the optional component database 183. It is assumed that deterioration scenarios with high priority or optional components effective as the countermeasures are per-decided and recorded in the storage unit 18. For example, it is considered that a mechanical deterioration such as crack or corrosion occurring in the gas turbine occurs in one gas turbine and only the one gas turbine is influenced in some cases. On the other hand, for example, an introduction of the HEM is effective in various deterioration scenarios occurring environments in which there is much corrosion or dust due to high concentration of $SO_2$ occurring in an HRSG. In this case, the optional component selection unit 15 selects the HEM as an optional component according to a relation between the per-decided deterioration scenarios and the countermeasures. The optional component may be selected by the optional component selection unit 15. In a stage in which step S14 ends, deterioration scenarios occurring in the plant, the deterioration degree of performance, candidates for the optional components, and the like may be displayed for the person in charge of evaluation on a display, the person in charge of evaluation is prompted to select an optional component, and the optional component selected by the person in charge of evaluation may be countermeasures against the deterioration factor.

Subsequently, the optional component selection unit 15 calculates an improvement value when the specified countermeasures are performed (an optional component is applied to a device) (step S16). For example, the performance information calculation unit 13 sets the performance of each device and the performance of the entire plant at an application start time of the optional component designated in step S11 (for example, an output, efficiency, or the like of an application time in the graphs in the lower part of FIG. 3(*a*)) as standards, applies the performance information of the device to which the application target optional component recorded in the optional component database 183 is applied or the performance information of another device, and calculates performance information after the application of the optional component. For example, when the optional component is an HEPA and the performance information of the gas turbine is recorded as 120% and the performance information of the steam turbine is recorded as 110% on the optional component database 183 after the application of the HEPA, the performance information calculation unit 13 sets a value obtained by multiplying an, output of the gas turbine at the application time by 1.2 (120%) as a gas turbine output after the application of the HEPA. The performance information calculation unit 13 sets a value obtained by multiplying the output of the steam turbine at the application time by 1.1 (110%) as a steam turbine output after the application of the HEPA. The performance information calculation unit 13 calculates an output of a power plant (GTCC) after the application of the HEPA according to the performance model of the entire plant.

Subsequently, the performance information calculation unit 13 calculates performance information of each device and the plant subsequently (in an operation after the application of the HEPA) until end of the evaluation period per evaluation unit time according to the performance information (the output of power generation, the fuel consumption amount, or the like) of the plant and each device at the time of application of the HEPA calculated in step S16 and the secular change calculation model 182. The performance information calculation unit 13 may calculate a heat balance of each device per evaluation unit time. Thus, the performance information for the entire evaluation period is calculated (step S17).

At this time, the performance information calculation unit 13 calculates the performance information per evaluation unit time until end of the evaluation period even when no optional component is introduced.

When the calculation of the performance information for the entire evaluation period (the output of power generation or a total amount of the fuel consumption amount) ends, the cost calculation unit 16 subsequently calculates an annual profit and cost (step S18). Specifically, the cost calculation unit 16 acquires the performance information per evaluation unit time dining the evaluation period from the performance information calculation unit 13 and calculates a power selling profit by multiplying a total output per year during the evaluation period by the power selling unit price recorded in the cost information database 184. The cost calculation unit 16 calculates fuel cost by multiplying the total amount of the fuel consumption amount per year during the evaluation period by a fuel unit price recorded in the cost information database 184. The cost calculation unit 16 calculates initial cost at the time of the introduction of the optional component.

At this time, the cost calculation unit 16 calculates a power selling profit and fuel cost at the time of no introduction of the optional component for a period until end of the evaluation period according to the performance information at the time of no introduction of the optional component.

The cost calculation unit 16 outputs information regarding the calculated profit and cost (at the time of the introduction and no introduction of the optional component) and the performance information per evaluation unit time acquired from the performance information calculation unit 13 to the output unit 17 and the control unit 12. The output unit 17 displays the information regarding the profit and the cost and the performance information on the display. At this time, the output unit 17 may display the performance information such as the output, the fuel consumption amount, the heat balance as a time-series graph.

Subsequently, the control unit 12 determines whether the plant evaluation process is continued (re-evaluated) (step S19). For example, the control unit 12 determines the re-evaluation when the profit or the cost calculated in step S18 does not reach a target power selling profit or a target fuel cost input by the person in charge of evaluation in step S13, For example, the control unit 12 determines the re-evaluation when the total output calculated in step S17 does not reach the target output input by the person in charge of evaluation in step S12. Alternatively, for example, when the person in charge of evaluation determines to add another optional component and desires to perform a simulation with reference to the performance information or the like displayed on the display, the re-evaluation is determined according to an operation of instructing the re-evaluation by the person in charge of evaluation.

When the re-evaluation is determined (Yes in step S19), the processes from step S11 are repeated. At this time, the person in charge of evaluation can perform resetting the various conditions, for example, by changing the application start time or the evaluation time of the optional component.

When the re-evaluation is not determined (No in step S19), the control unit 12 sets the configuration of the devices of the plant as decided information (step S20). The output unit 17 displays the decided information on the display. Here, an example of the decided information displayed on the display will be described. For example, the decided information is the configuration information (plant form) of the plant corresponding to the plant form set in step S11, the added optional component, the application start time of the optional component, the initial cost of the optional component, total outputs at the time of application or no application of the optional component, a graph indicating a secular change of the output, a total use amount of fuel, a graph indicating a secular change in a fuel use amount, the power selling profit, the fuel cost, and the like.

With reference to the output information, the person in charge of evaluation can examine the initial cost at the time of the introduction of the optional component and an investment return time due to an increase in the power selling profit by performance recovery after the introduction of the optional component or a decrease in the fuel cost a power generation efficiency improvement.

According to the embodiment, not only performance information at the time of design but also a secular change and performance deterioration can be simulated for the plant or a device included in the plant. Further, it is possible to quantify the improvement in the performance when the optional component effective for recovery of the performance is applied. By calculating an initial cost of the optional component, an output of a power plant, a power selling profit in accordance with an amount of use fuel, and a fuel expense, it is possible to ascertain the advantage of introducing the optional component from not only the performance but also an economic side.

It is possible to perform economic evaluation of the plant in the future irrespective of no instruction of an optional component. In the plant evaluation device 10 according to the embodiment, the maker can propose a plant maintenance plan with excellent economy. A customer introducing an optional component to a plant can increase a profit due to an increase in an output and a fuel expense reduction effect by deterioration recovery of the performance and further enjoy the advantage of reducing total cost due to extension of an inspection period and a long life of each device by deterioration recovery.

Second Embodiment

Hereinafter, a plant evaluation device according to a second embodiment of the present invention will be described with reference to FIGS. 6 to 8.

A plant evaluation device 10A according to the second embodiment will be described. The plant evaluation device 10A calculates a power selling profit or fuel cost in accordance with a different method from the first embodiment.

Figure 6:
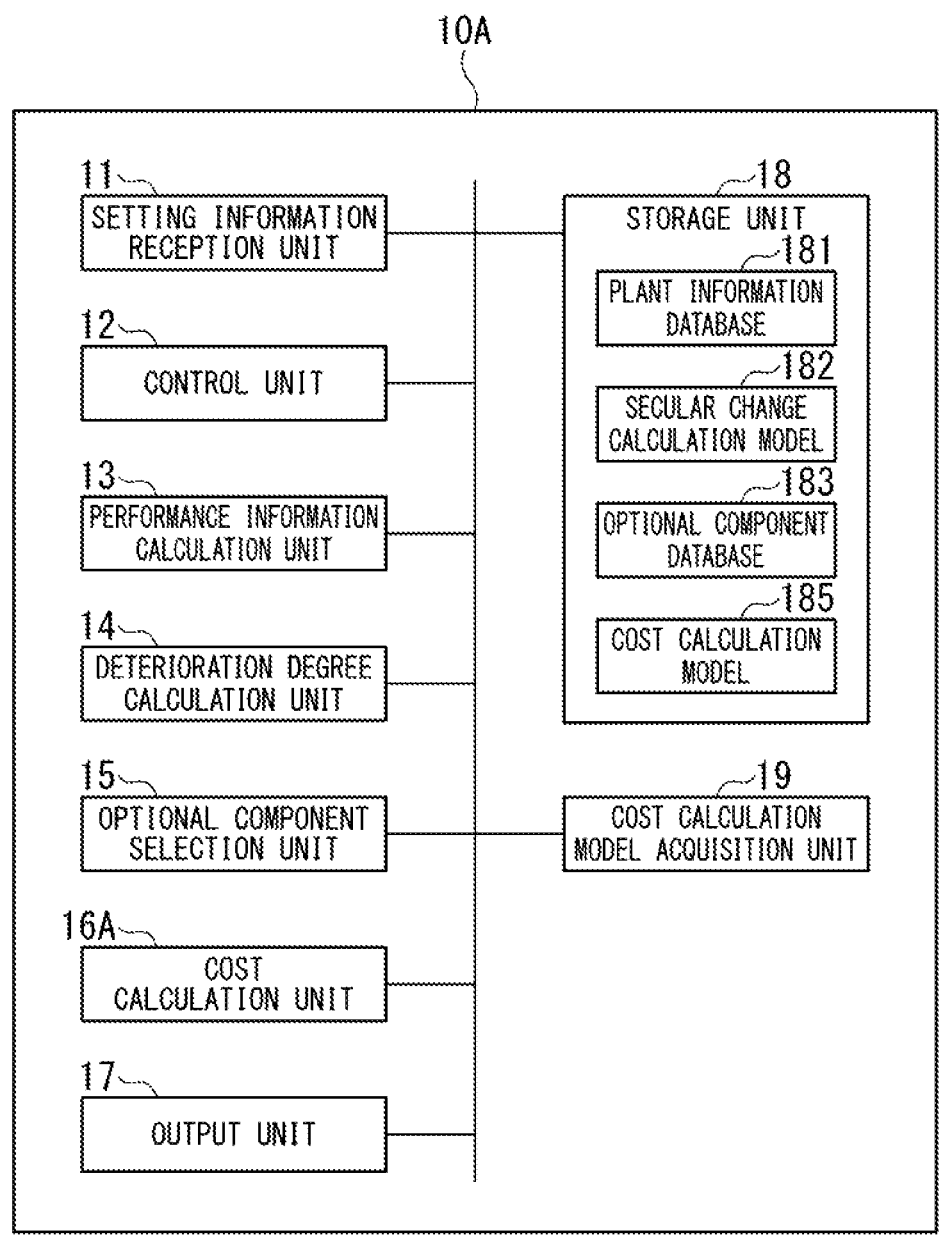
FIG. 6 is a functional block diagram showing a plant evaluation device according to a second embodiment of the present invention.

FIG. 6 is a functional block diagram showing a plant evaluation device according to a second embodiment of the present invention.

In configurations according to the second embodiment of the present invention, the same reference sins are given to the same configuration as the functional units included in the plant evaluation device 10 according to the first embodiment and description thereof will be omitted. As shown the plant evaluation device 10A includes the setting information reception unit 11, the control unit 12, the performance information calculation unit 13, the deterioration degree calculation unit 14, the optional component selection unit 15, a cost calculation unit 16A, the output unit 17, a storage unit 18, and a cost calculation model acquisition unit 19. The storage unit 18 includes the plant information database 181, the secular change calculation model 182, the optional component database 183, and a cost calculation model 185.

The cost calculation unit 16A calculates a power selling profit and fuel cost using the cost calculation model. For example, the cost calculation unit 16A calculates a predicted value of a power selling price at an evaluation time by a function or the like in which the predicted value of the power selling unit price included in the cost calculation model corresponds to a time, and calculates a power selling profit at the evaluation time by multiplying the calculated predicted value of the power selling price by a generated power amount (generated power output) at that time. For example, the cost calculation unit 16A may calculate the power selling profit per evaluation unit time and estimate the power selling profit between the evaluation unit times and may integrate the power selling profits to calculate a sum of the power selling profits during the entire evaluation period.

For example, the cost calculation unit 16A calculates a predicted value of a fuel price at an evaluation time by a function or the like in which the predicted value of the fuel price included in the cost calculation model corresponds to a time, and calculates fuel cost at the evaluation time by multiplying the calculated predicted value of the fuel unit price by an amount of used fuel at that time. For example, the cost calculation unit 16A may calculate the fuel cost per evaluation unit time and estimate the fuel cost between the evaluation unit times and may integrate the fuel cost to calculate a sum of the fuel cost during the entire evaluation period.

The cost calculation model acquisition unit 19 receives an input of the cost calculation model used to predict a power selling unit price or a fuel price. Since the power selling unit price or the fuel price depend on price setting or the like in an import route of a fuel or a power selling destination, there is a possibility of the power selling unit price or the fuel price being different for each customer miming, a plant. Accordingly, the person in charge of evaluation inputs a cost calculation model to the plant evaluation device 10A in accordance with an evaluation target plant.

The cost calculation model 185 includes prediction model data used to predict a power selling unit price or a fuel price.

Next, a flow of a plant evaluation process according to the second embodiment will be described with reference to FIG. 7.

Figure 7:
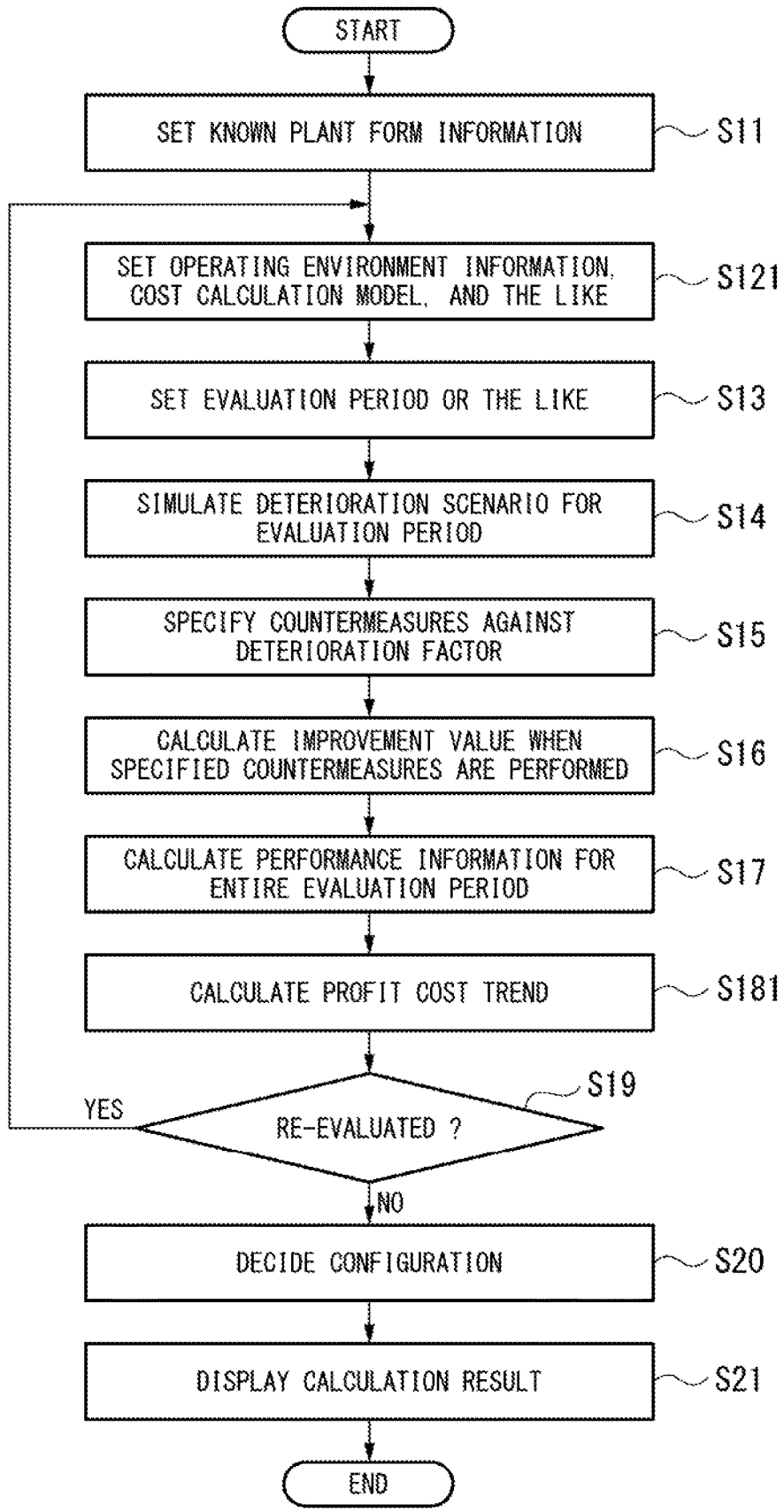
FIG. 7 is a flowchart showing an example of a plant evaluation process according to the second embodiment of the present invention.

FIG. 7 is a flowchart showing an example of a plant evaluation process according to the second embodiment of the present invention. Similar processes to those of FIG. 5 will be described in brief.

First, the control unit 12 sets the plant form information (step S11). Subsequently, the person in charge of evaluation inputs the cost calculation model 185 along with conditions such as operating environment information (air temperature) regarding an evaluation target plant. The cost calculation model acquisition unit 19 records the input cost calculation model 185 in the storage unit 18 (step S121). Subsequently, the setting information reception unit 11 acquires information regarding a simulation process condition and the control unit 12 sets the information as simulation setting information (step S13). Subsequently, according to an instruction from the person in charge of evaluation, the control unit 12 instructs each functional unit to start the plant evaluation process.

First, the deterioration degree calculation unit 14 simulates a deterioration scenario for the evaluation period (step S14), Subsequently, the optional component selection unit 15 specifies countermeasures (optional component) against the deterioration factor (step S15). Subsequently, the optional component selection unit 15 calculates an improvement value when the specified countermeasures are performed (step S16). Subsequently; the performance information calculation unit 13 calculates the performance information for the entire evaluation period (step S17). When the calculation of the performance information for the entire evaluation period (the output or a total amount of the fuel consumption amount of the plant) ends, the cost calculation unit 16A subsequently calculates a profit cost trend (step S181). Specifically, the cost calculation unit 16A reads the cost calculation model 185 from the storage unit 18. Then, a predicted value of the fuel unit price and a predicted value of the power selling unit price per evaluation unit time during the evaluation period are calculated. Then, the cost calculation unit 16A calculates fuel cost by multiplying the predicted value of the fuel unit price by the fuel consumption amount at the evaluation target time. The cost calculation unit 16A calculates a power selling profit by multiplying the predicted value of the power selling unit price by the output of the power plant at the evaluation target time. The cost calculation unit 16A integrates the fuel cost and the power selling profit at each time for the evaluation target period and calculates a sum of the fuel cost and sum of the power selling profits fix the evaluation period. For between the unit evaluation time, the predicted value of the fuel unit price and the predicted value of the power selling unit price at each time may be calculated, for example, by performing linear interpolation.

Subsequently, the control unit 12 determines whether the plant evaluation process is continued (re-evaluated) (step S19). When the re-evaluation is determined (Yes in step S19), the processes from step S11 are repeated. At this time, the person in charge of evaluation can perform economic evaluation of the plant suitable for prediction patterns of various fuel unit prices and power selling unit prices by inputting the different cost calculation models 185 from the previous models. Conversely, when the re-evaluation is not determined (No in step S19), the control unit 12 sets the configuration of the devices of the plant as decided information (step S20). The output unit 17 displays the decided information on the display. FIG. 8 shows example of information displayed by the output unit 17.

Figure 8:
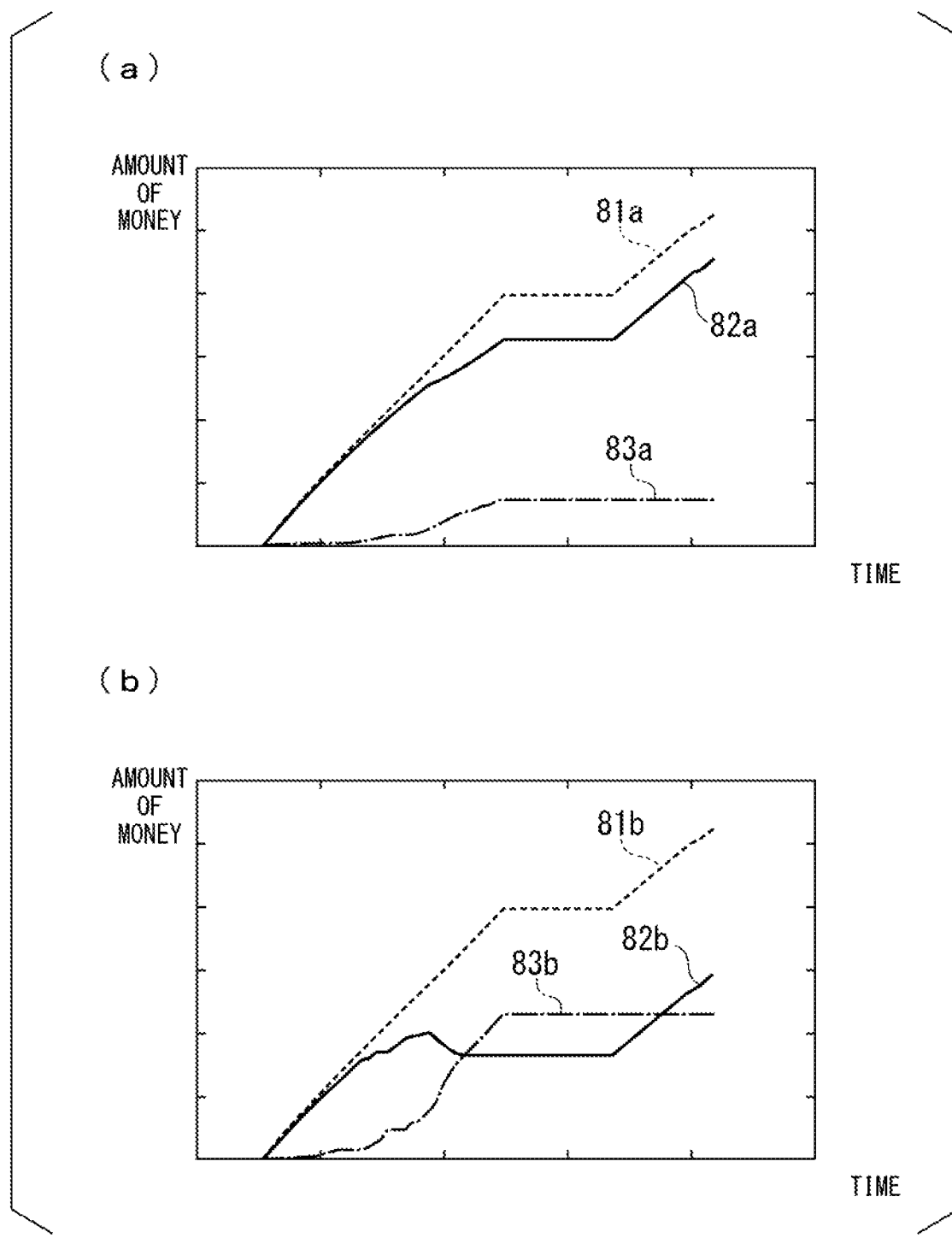
FIG. 8 is a diagram showing an example of a plant evaluation result according to the second embodiment of the present invention.

FIG. 8 is a diagram showing an example of a plant evaluation result according to the second embodiment of the present invention.

FIG. 8(a) shows a profit cost trend of a result obtained by setting a value increased by β% as a target output and performing the plant evaluation process with addition of an optional component FIG. 8(b) shows a profit cost trend of a result obtained by setting a value increased by γ% as a target output and performing the plant evaluation process. Here, is satisfied. In FIGS. 8(a) and 8(b), the vertical axis represents an amount of money and the horizontal axis represents a time.

A graph 81a shows a secular change in a sum of a profit by an increase in a power selling amount and a profit by fuel cost reduction at the time of an increase of an output β%. A graph 82a shows a secular change of the profit by fuel cost reduction at the time of an increase of an output β%. A graph 83a shows a secular change of the profit by an increase in the power selling amount at the time of an increase of an output β%.

A graph 81b shows a secular change in a sum of a profit by an increase in a power selling amount and a profit by fuel cost reduction at the time of an increase of an output γ%. A graph 82b shows a secular change of the profit by fuel cost reduction at the time of an increase of an γ%. A graph 83b shows a secular change of the profit by an increase in the power selling amount at the time of an increase of an output γ%.

In FIGS. 8(a) and 8(b), it is shown that the profits by the increase in the power selling amount (the graphs 83a and 83b) and the profits by the fuel cost reduction (the graphs 82a and 82b) are reversed. This is because it is considered that the profit by the increase in the power selling amount is larger in the case of FIG. 8(b) than in the case of FIG. 8(a) since the output increase amount (γ%) is increased, but the profit by the fuel cost reduction is reduced due to large consumption of the fuel by that extent. Depending on the value of the power selling unit price or the fuel unit price, the tendency varies or a change occurs in a period in which the profit by the increase in the power selling amount is greater than the profit by the fuel cost reduction. Referring to the graphs of the profit cost trends, the person in charge of evaluation can check the power selling unit price and the fuel unit price at which the profits can be obtained or an efficient operating method for the plant by appropriately changing the target output changing content of the cost calculation model 185. By introducing the cost calculation model 185, it is possible to ascertain the economic value of the power plant in the future more accurately.

According to the embodiment, it is possible to obtain the effect of ascertaining the transition of the profit and the cost for the evaluation target period in addition to the effect of enabling quantified plant evaluation from both the performance and the economic value in which the secular change and the introduction effect of the optional component is reflected in the first embodiment.

The foregoing plant evaluation devices 10 and 10A are examples of the plant evaluation device. A procedure of the processes in the plant evaluation devices 10 and 10A is stored in a pro ram format on a computer-readable recording medium. Thus, the foregoing processes are performed by allowing computers of the plant evaluation devices 10 and 10A to read and execute the program. Here, the computer-readable recording medium refers to a magnetic disk, a magneto-optical disc, a CD-ROM, a DVD-ROM, or a semiconductor memory. The computer program may be delivered to a computer via a communication line and the computer to which the computer program is delivered may execute the program.

The program may be a program for realizing some of the above-described functions.

Further, the program may be a so-called differential file (differential program) that can be realized by combination with a program in which the above-described functions have already been recorded in a computer system.

The plant evaluation devices 10 and 10A may be configured with one computer or may be configured with a plurality of computers connected to communicate with each other.

In addition, the constituent elements in the foregoing embodiments can be appropriately substituted with known constituent elements within the scope of the present invention without departing from the gist of the present invention. The technical scope of the present invention is not limited to the foregoing embodiments and various modifications can be added within the scope of the present invention without departing from the gist of the present invention.

The setting information reception unit is an example of a plant form information acquisition unit and an example of a condition acquisition unit. The fuel cost is an example of running cost.

INDUSTRIAL APPLICABILITY

The plant evaluation system, the plant evaluation method, and the program described above, it is possible to evaluate a plant appropriately in consideration of a secular change in the plant and measures for remedying the secular change.

REFERENCE SIGNS LIST 10, 10A Plant evaluation device
11 Setting information reception unit
12 Control unit
13 Performance calculation unit
14 Deterioration degree calculation unit
15 Optional component selection unit
16, 16A Cost calculation unit
17 Output unit
18 Storage unit
19 Cost calculation module acquisition unit
181 Plant information database
182 Secular change calculation model
183 Optional component database
184 Cost information database
185 Cost calculation model

What is claimed is:

1. A plant evaluation system comprising:
   devices installed in a plant;
   a plant evaluation device comprising:
   a plant form information acquisition unit configured to receive an input of plant form information in which a combination of configurations of the devices installed in the plant is decided;
   a condition acquisition unit configured to receive an input of a condition related to evaluation of the plant indicated by the plant form information;
   a storage unit configured to store:
     a performance-deterioration model which outputs a deterioration degree of performance of a first device which is included in the devices, a deterioration degree of performance of a second device which is included in the devices and operates by receiving an output from the first device, and a deterioration degree of performance of the plant when an elapsed time from an operation start of the plant or an operating pattern during the elapsed time are input to the performance-deterioration model,
     an option-component database which is configured to store how much the performance of the first device, the performance of the second device, and the performance of the plant are improved for each of the components which can be mounted on the first device, and
     a performance model which defines how to calculate the performance of the plant according to the performance of the devices;
   a performance information calculation unit configured to calculate performance of the plant in which a secular change occurring in the plant during an evaluation target period included in the condition is reflected, by reflecting the deterioration degree of performance of the plant per a predefined evaluation unit time, which is output by the performance-deterioration model by inputting the elapsed time per the evaluation unit time over the evaluation target period or the operating pattern to the performance-deterioration model, to the performance of the plant;
   an option-component selection unit configured to select a component which is used for at least one of the devices included in the plant and improving performance of the device among the components which are stored in the option-component database according to a predefined priority; and
   an output unit configured to output information on the performance of the plant, which is calculated by the performance information calculation unit, to a display,
   wherein the performance information calculation unit is configured to calculate an improvement of the performance of the first device to which the component is added, due to adding the component selected by the option-component selection unit to the first device, according to the option-component database, and calculate the performance of the plant in which the improvement of the performance of the first device is reflected according to the performance of the first device which is calculated and the performance model, and
   the option-component selection unit is configured to specify the component that compensates for the deterioration in the performance of the devices caused due to a deterioration factor for which priority of countermeasures is highest according to a predefined priority of the countermeasures,
   wherein the plant is a power plant,
   wherein the device is a gas turbine, and
   wherein the component is a filter which is mounted on an inlet side of a compressor included in the gas turbine and serves a function of causing harmful substances causing deterioration of the gas turbine and the plant not to be input.

2. The plant evaluation system according to claim 1, wherein the performance information calculation unit is configured to calculate the improvement of the performance of the first device to which the component is added due to adding the component selected by the option-component selection unit to the first device and an improvement of the performance of the second device due to adding the component according to the option-component database, and calculate the performance of the plant in which the improvement of the performance of the first device and the improvement of the performance of the second device are reflected according to the performance of the first device the performance of the second device which are calculated and the performance model.

3. The plant evaluation system according to claim 1, wherein the option-component selection unit is configured to select a second component in prior to a first component out of the first component which improves only the performance of the first device when the first component is added to the first device and the second component which improves the performance of the second device in addition to the performance of the first device.

4. The plant evaluation system according to claim 3, wherein, in the performance model, how the performance of the plant is calculated is defined for each combination of configurations of the devices, and wherein the performance information calculation unit is configured to calculate the performance of the plant when the component is added according to the combination of the configurations of the devices, the performance model, and the option-component database.

5. The plant evaluation system according to claim 1,
wherein the storage unit is configured to further store a cost information database which is configured to store a fuel unit price of the plant,
wherein the option-component database is configured to further store an initial cost for each of the components,
wherein the performance information calculation unit is configured to calculate an output of the plant when the component is added to the plant and the plant is operated over the evaluation target period, and calculate a fuel consumption amount according to a relation between the out of the output of the plant when the component is added and the fuel consumption amount required for the output, and
wherein the plant evaluation system further comprising:
a cost calculation unit configured to calculate initial cost of the component according to the option-component database, and calculate running cost according to performance improved by adding the component by multiplying the fuel consumption amount calculated by the performance information calculation unit by the fuel unit price stored in the cost information database.

6. The plant evaluation system according to claim 5,
wherein the cost information database is configured to further store a power selling unit price,
wherein the performance model defines how to calculate a generated power amount which the plant can generate according to the performance of the device,
wherein the storage unit is configured to further store information indicating a relation between the generated power amount of the plant and the fuel consumption amount required for generating the generated power amount,
wherein the performance information calculation unit is configured to:
  calculate a first generated power amount when the component is not added to the plant and the plant is operated over the evaluation target period according to the performance model, and calculate a first fuel consumption amount required for the operation according to the first generated power amount and the information indicating the relation between the generated power amount of the plant and the fuel consumption amount required for generating the generated power amount, and
  calculate a second generated power amount when the component is added to the plant and the plant is operated over the evaluation target period according to the performance model, and calculate a second fuel consumption amount required for the operation according to the second generated power amount and the information indicating the relation between the generated power amount of the plant and the fuel consumption amount required for generating the generated power amount, and
wherein the cost calculation unit is configured to calculate cost regarding fuel cost able to be reduced by multiplying a value obtained by reducing the second generated power amount from the first generated power amount by the fuel unit price and, calculate a profit obtained by increasing power selling by multiplying a value obtained by reducing the first fuel consumption amount from the second fuel consumption amount by the power selling unit price.

7. The plant evaluation system according to claim 6, wherein the storage unit is configured to further store a prediction model of the power selling unit price which outputs a predicted value of the power selling unit price at a first evaluation time when the first evaluation time is input to the prediction model,
wherein the performance information calculation unit is configured to calculate the generated power amount per evaluation unit time over the evaluation target period when the component is added to the plant and the plant is operated over the evaluation target period,
wherein the cost calculation unit is configured to calculate the predicted value of the power selling unit price per evaluation unit time over the evaluation target period according to the prediction model of the power selling unit price, calculate a power selling price per evaluation unit time by multiplying the predicted value of the power selling unit price per evaluation unit time by the generated power amount for the corresponding evaluation unit time, and calculate the power selling price in accordance with the generated power amount by integrating the power selling price over the evaluation target period.

8. The plant evaluation system according to claim 6, wherein the storage unit is configured to further store a prediction model of the fuel unit price which outputs a predicted value of fuel unit price at a second evaluation time when the second evaluation time is input to the prediction model,
wherein the performance information calculation unit is configured to calculate the fuel consumption amount per evaluation unit time over the evaluation target period when the component is added to the plant and the plant is operated over the evaluation target period,
wherein the cost calculation unit is configured to calculate the predicted value of the fuel unit price per evaluation unit time over the evaluation target period according to the prediction model of the fuel unit price, calculate a fuel price per evaluation unit time by multiplying the predicted value of the fuel unit price per evaluation unit time by the fuel consumption amount for the corresponding evaluation unit time, and calculate the fuel price necessary for the power plant to generate power by integrating the fuel price over the evaluation target period.

9. The plant evaluation system according to claim 1,
wherein the component is a high efficiency particulate air filter (HEPA).

10. A plant evaluation method executed by a plant evaluation system including devices installed in a plant, and a plant evaluation device including a storage unit configured to store:
a performance-deterioration model which outputs, regarding the devices in the plant, a deterioration degree of performance of a first device which is included in the devices, a deterioration degree of performance of a second device which is included in the devices and operates by receiving an output from the first device, and a deterioration degree of performance of the plant when an elapsed time from an operation start of the plant or an operating pattern during the elapsed time are input to the performance-deterioration model,
an option-component database which is configured to store how much the performance of the first device, the performance of the second device, and the performance of the plant are improved for each of the components which can be mounted on the first device, and
a performance model which defines how to calculate the performance of the plant according to the performance of the devices, the plant evaluation method comprising:
a step of receiving an input of plant form information in which a combination of configurations of the devices installed in the plant is decided;
a step of receiving an input of a condition related to evaluation of the plant indicated by the plant form information;
a step of calculating performance of the plant in which a secular change occurring in the plant during an evaluation target period included in the condition is reflected, by reflecting the deterioration degree of performance of the plant per a predefined evaluation unit time, which is output by the performance-deterioration model by inputting the elapsed time per the evaluation unit time over the evaluation target period or the operating pattern to the performance-deterioration model, to the performance of the plant;
a step of selecting a component which is used for at least one of the devices included in the plant to improve performance of the device among the components which are stored in the option-component database according to a predefined priority; and
a step of outputting information on the performance of the plant, which is calculated in the step of calculating of the performance of the plant, to a display,
wherein in the step of calculating of the performance of the plant, an improvement of the performance of the first device to which the component is added, due to adding the component selected to the first device, is calculated according to the option-component database, and
wherein in the step of selecting the component, the component that compensates for the deterioration in the performance of the devices caused due to a deterioration factor for which priority of countermeasures is highest is specified according to a predefined priority of the countermeasures,
wherein the plant is a power plant,
wherein the device is a gas turbine, and
wherein the component is a filter which is mounted on an inlet side of a compressor included in the gas turbine and serves a function of causing harmful substances causing deterioration of the gas turbine and the plant not to be input.

11. A non-transitory computer-readable medium that stores a program causing a computer included in a plant evaluation system including devices installed in a plant, and a plant evaluation device including a storage unit configured to store:
a performance-deterioration model which outputs, regarding the devices in the plant, a deterioration degree of performance of a first device which is included in the devices, a deterioration degree of performance of a second device which is included in the devices and operates by receiving an output from the first device, and a deterioration degree of performance of the plant when an elapsed time from an operation start of the plant or an operating pattern during the elapsed time are input to the performance-deterioration model,
an option-component database which is configured to store how much the performance of the first device, the performance of the second device, and the performance of the plant are improved for each of the components which can be mounted on the first device, and
a performance model which defines how to calculate the performance of the plant according to the performance of the devices, to function as:
a means for receiving an input of plant form information in which a combination of configurations of the devices installed in the plant is decided;
a means for receiving an input of a condition related to evaluation of the plant indicated by the plant form information;
a means for calculating performance of the plant in which a secular change occurring in the plant during an evaluation target period included in the condition is reflected, by reflecting the deterioration degree of performance of the plant per a predefined evaluation unit time, which is output by the performance-deterioration model by inputting the elapsed time per the evaluation unit time over the evaluation target period or the operating pattern to the performance-deterioration model, to the performance of the plant;
a means for selecting a component which is used for at least one of the devices included in the plant and improving performance of the device among the components which are stored in the option-component database according to a predefined priority; and
a means for outputting information on the performance of the plant, which is calculated by the means for calculating the performance of the plant, to a display,
wherein the means for calculating the performance of the plant is configured to calculate an improvement of the performance of the first device to which the component is added, due to adding the component selected to the first device, according to the option-component database, and
wherein the means for selecting a component is configured to specify the component that compensates for the deterioration in the performance of the devices caused due to a deterioration factor for which priority of countermeasures is highest according to a predefined priority of the countermeasures,
wherein the plant is a power plant,
wherein the device is a gas turbine, and
wherein the component is a filter which is mounted on an inlet side of a compressor included in the gas turbine and serves a function of causing harmful substances causing deterioration of the gas turbine and the plant not to be input.

\* \* \* \* \*